(12) United States Patent
Goldman-Shenhar et al.

(10) Patent No.: US 9,476,729 B2
(45) Date of Patent: Oct. 25, 2016

(54) ADAPTIVE NAVIGATION AND LOCATION-BASED SERVICES BASED ON USER BEHAVIOR PATTERNS

(71) Applicant: GM GLOBAL TECHNOLOGY OPERATIONS LLC, Detroit, MI (US)

(72) Inventors: Claudia V. Goldman-Shenhar, Mevasseret Zion (IL); Amir Konigsberg, Herzliya Pituach (IL); Peggy Wang, Shanghai (CN); Omer Tsimhoni, Ramat Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/290,693

(22) Filed: May 29, 2014

(65) Prior Publication Data

US 2015/0345981 A1 Dec. 3, 2015

(51) Int. Cl.
| | |
|---|---|
| *G01C 21/00* | (2006.01) |
| *G01C 21/36* | (2006.01) |
| *G06K 9/00* | (2006.01) |
| *G10L 25/48* | (2013.01) |
| *G10L 25/63* | (2013.01) |

(52) U.S. Cl.
CPC ........ *G01C 21/3629* (2013.01); *G01C 21/3602* (2013.01); *G01C 21/3641* (2013.01); *G06K 9/00604* (2013.01); *G06K 9/00845* (2013.01); *G10L 25/48* (2013.01); *G10L 25/63* (2013.01)

(58) Field of Classification Search
CPC .... G08G 1/0104; G08G 1/052; G08G 1/166; G08G 1/167; G08G 1/205; A61B 5/0205; A61B 5/0476; A61B 5/055; A61B 5/1103; A61B 5/14553; A61B 5/18; A61B 2562/0257; A61B 5/1114; A61B 5/6893
USPC ......... 701/9, 36, 41, 45, 66, 70, 78, 93, 96, 701/110, 117, 119, 30.8, 31.1, 32.3, 4, 24, 701/431, 301, 211; 340/439, 435, 438, 340/426.34, 436, 460, 575, 576, 573.7, 667, 340/7.58, 7.6, 2; 180/68, 170, 268, 9.38
See application file for complete search history.

(56) References Cited

U.S. PATENT DOCUMENTS

| | | | |
|---|---|---|---|
| 6,246,933 B1 * | 6/2001 | Bague | G07C 5/085 340/438 |
| 2004/0044293 A1 * | 3/2004 | Burton | A61B 5/18 600/544 |

(Continued)

FOREIGN PATENT DOCUMENTS

AU 2010/101243 * 12/2010

*Primary Examiner* — Muhammad Shafi
(74) *Attorney, Agent, or Firm* — John A. Miller; Miller IP Group, PLC (57) ABSTRACT

A method and system are disclosed for adaptive driver guidance for navigation and location-based services based on user behavior patterns. A driver-facing camera and a gaze tracking system determine the location of the driver's visual focus while an outside-facing camera detects and interprets external driving situations, a microphone and a speech analyzer identify driver vocalizations, and driver-proximate sensors and the driver-facing camera detect driver emotions. The driver's visual focus, the driver vocalizations and the driver emotions, along with vehicle system parameters from a data bus, are used to evaluate driver satisfaction with navigation guidance and determine driver behavior patterns. An adaptive navigation guidance engine modifies navigation guidance content and timing based on the driver satisfaction and behavior patterns. Adaptation of guidance for location-based services is also provided.

20 Claims, 6 Drawing Sheets

(56) References Cited

U.S. PATENT DOCUMENTS

| | | | |
|---|---|---|---|
| 2009/0176511 A1* | 7/2009 | Morrison | G06Q 30/02 455/456.3 |
| 2009/0254836 A1* | 10/2009 | Bajrach | G11B 27/105 715/745 |
| 2010/0222976 A1* | 9/2010 | Haug | B60K 28/04 701/70 |
| 2010/0223581 A1* | 9/2010 | Manolescu | G06Q 10/10 715/853 |
| 2012/0212353 A1* | 8/2012 | Fung | B60K 28/06 340/905 |

* cited by examiner

ADAPTIVE NAVIGATION AND LOCATION-BASED SERVICES BASED ON USER BEHAVIOR PATTERNS

BACKGROUND OF THE INVENTION

1. Field of the Invention

This invention relates generally to adaptive driver guidance in a vehicle navigation system and, more particularly, to adaptive guidance for navigation and location-based services, where driver behavior—including gaze direction, facial expressions, speech and biometric responses—is monitored by a variety of sensors, and the timing and frequency of navigation guidance may be increased, decreased or modified based on the driver behavior patterns.

2. Discussion of the Related Art

Navigation systems have become increasingly popular with vehicle drivers in recent years, as the functionality and reliability of such systems have improved dramatically. Many new vehicles include a navigation system delivered as original equipment by the vehicle manufacturer, which is typically integrated with a telematics system and vehicle audio/visual systems. Other types of navigation systems include stand-alone devices which can be purchased and simply placed in a vehicle, and even smart phones equipped with navigation application software. With all of these types of navigation systems, route planning, visual map display and turn-by-turn driver guidance are available. Many navigation systems also include location-based services (LBS), where suggestions are provided to a driver about activities, promotions or other conveniences at a location. Collectively, these features have made navigation systems virtually indispensable to many drivers.

However, different drivers have different preferences for how navigation and LBS guidance is provided. Some drivers prefer frequent, somewhat repetitive guidance, which provides a sense of assurance that they are on the right route. Other drivers prefer minimal guidance, and become annoyed if the navigation system repeats any information. Many drivers prefer navigation guidance somewhere in between the repetitive and the minimal. Furthermore, most drivers do not take the time to configure a navigation system with guidance preferences. In addition, there are situations where additional or modified guidance would be helpful to any driver, regardless of his or her general preferences. These situations include confusing roadway configurations, adverse traffic and weather conditions, and changes in driver emotional state.

SUMMARY OF THE INVENTION

In accordance with the teachings of the present invention, a method and system are disclosed for adaptive driver guidance for navigation and location-based services based on user behavior patterns. A driver-facing camera and a gaze tracking system determine the location of the driver's visual focus while an outside-facing camera detects and interprets external driving situations, a microphone and a speech analyzer identify driver vocalizations, and driver-proximate sensors and the driver-facing camera detect driver emotions. The driver's visual focus, the driver vocalizations and the driver emotions, along with vehicle system parameters from a data bus, are used to evaluate driver satisfaction with navigation guidance and determine driver behavior patterns. An adaptive navigation guidance engine modifies navigation guidance content and timing based on the driver satisfaction and behavior patterns. Adaptation of guidance for location-based services is also provided.

Additional features of the present invention will become apparent from the following description and appended claims, taken in conjunction with the accompanying drawings.

DETAILED DESCRIPTION OF THE EMBODIMENTS

The following discussion of the embodiments of the invention directed to adaptive user guidance for navigation and location-based services based on user behavior patterns is merely exemplary in nature, and is in no way intended to limit the invention or its applications or uses.

Many vehicle drivers use navigation systems to provide route guidance and maps, including turn-by-turn navigational guidance. Navigation systems used by drivers include systems integrated with the vehicle by the vehicle manufacturer, hand-held systems which the driver simply places in the vehicle, and even smart phones equipped with a navigation application. As discussed in detail below, navigation systems which are integrated with the vehicle can take advantage of sensors and data available onboard the vehicle to assess driver behavior and adapt the guidance being provided.

With any type of navigation system, errors are inevitable. This includes system errors and driver errors. System errors occur when the navigation system provides inaccurate or untimely information, or fails to provide information, due to a loss of Global Positioning System (GPS) satellite signals or for other reasons. Driver errors occur when a driver misunderstands or fails to follow navigation instructions, and makes a wrong turn, misses a turn, etc. Driver errors also result from failure to comprehend of the driving situation—i.e., the traffic, the road conditions, the weather, visibility conditions, etc. Some drivers, under some circumstances, are more prone to making driving or navigational errors than others. Similarly, some driving routes and roadway locations also experience a relatively high frequency of navigational errors. Driver behavior data can be used to help mitigate driver errors, both in error-likely locations and otherwise. Driver behavior data can be also used to better tune the navigation system to interact with the driver. This adjustment is not merely to help mitigate driver errors but to improve the user interaction with the automated system.

Figure 1:
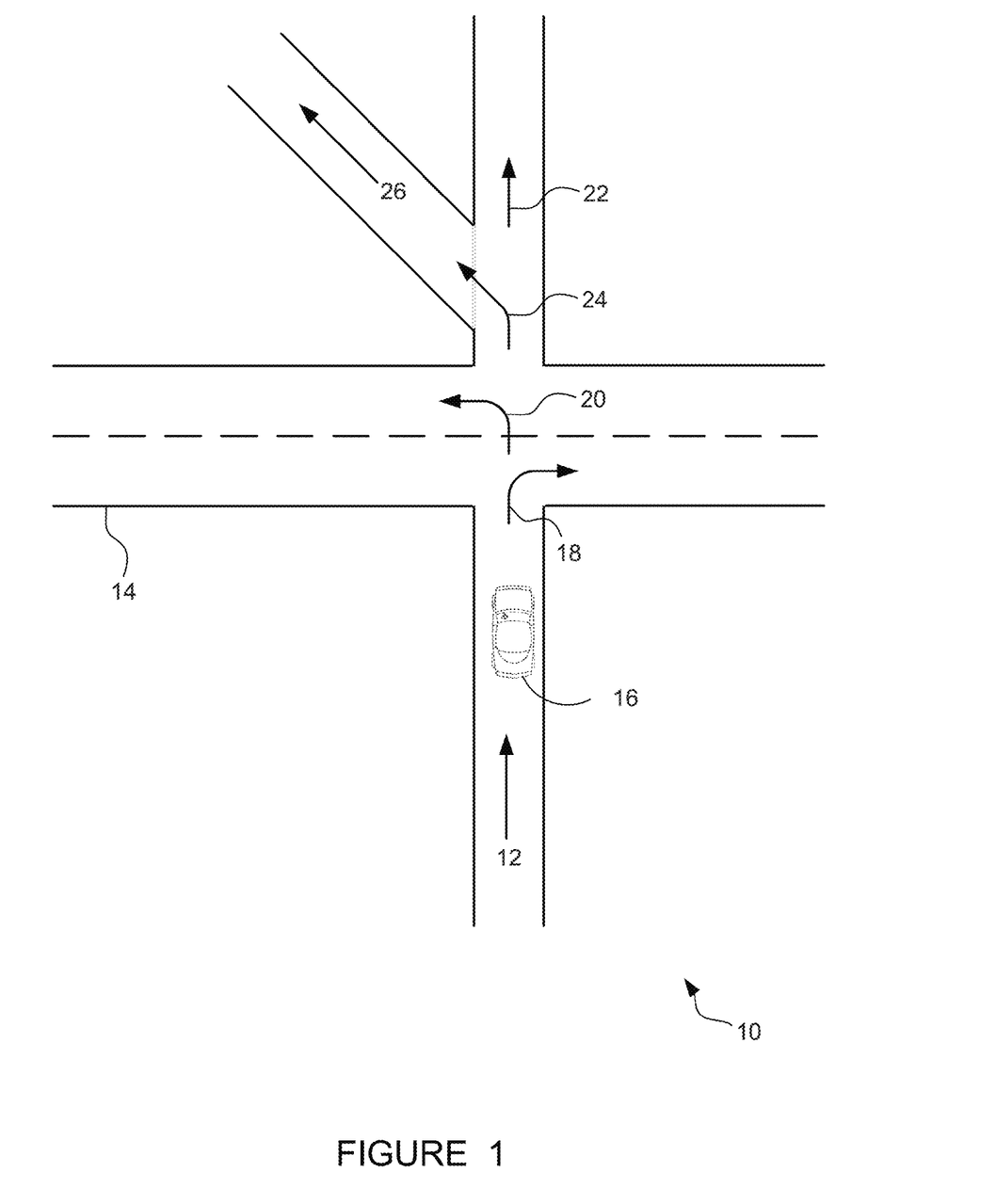
FIG. 1 is an illustration of a roadway scenario where drivers frequently make mistakes when attempting to follow navigational guidance.

FIG. 1 is a plan view illustration of a roadway scenario 10 where drivers may frequently make mistakes when attempting to follow navigation guidance. The scenario 10 includes a northbound lane 12 which intersects an east-west crossroad 14. A vehicle 16 is traveling on the northbound lane 12, and the driver is receiving navigation guidance from a navigation system. When approaching the crossroad 14, the driver of the vehicle 16 is faced with several choices. The vehicle 16 can make a right turn 18, make a left turn 20, or continue straight ahead at 22. The three aforementioned choices are to be expected by the driver of the vehicle 16. However, the scenario 10 also includes a fourth navigation choice—namely a diagonal left 24 onto road 26. The diagonal left 24 may be an unexpected option to the driver, and furthermore, it may be difficult to see. If the navigation system in the vehicle 16 simply instructs the driver, for example, "after 500 meters, turn left", the driver could mistakenly make the left turn 20 onto the crossroad 14.

Other roadway geometries which are similarly susceptible to driver navigation errors can easily be envisioned. Such error-likely types of roadways include double exit lanes, where two exit lanes split from a multi-lane expressway and then further split right and left, and roads with two closely-spaced intersections. Driving errors are also likely at any roadway location where an interchange or intersection is difficult to see—such as where visibility of a turn or exit is obstructed by a tree, a sign, a railing or a hill.

The objective of a navigation system is to guide a driver safely and efficiently to the prescribed destination. A driver who makes a wrong turn or other navigation error is not likely to be satisfied with the navigation system. On the other hand, a driver who feels irritated by the guidance commands is also not likely to be satisfied with the navigation system. The techniques described below have been developed to not only reduce the incidence of driver errors (of the type illustrated in FIG. 1) through adaptive guidance, but also to conform to a driver's guidance preferences, through the monitoring of driver behavior. The techniques are also applied to location-based services (LBS) which may be provided by a navigation system.

Figure 2:
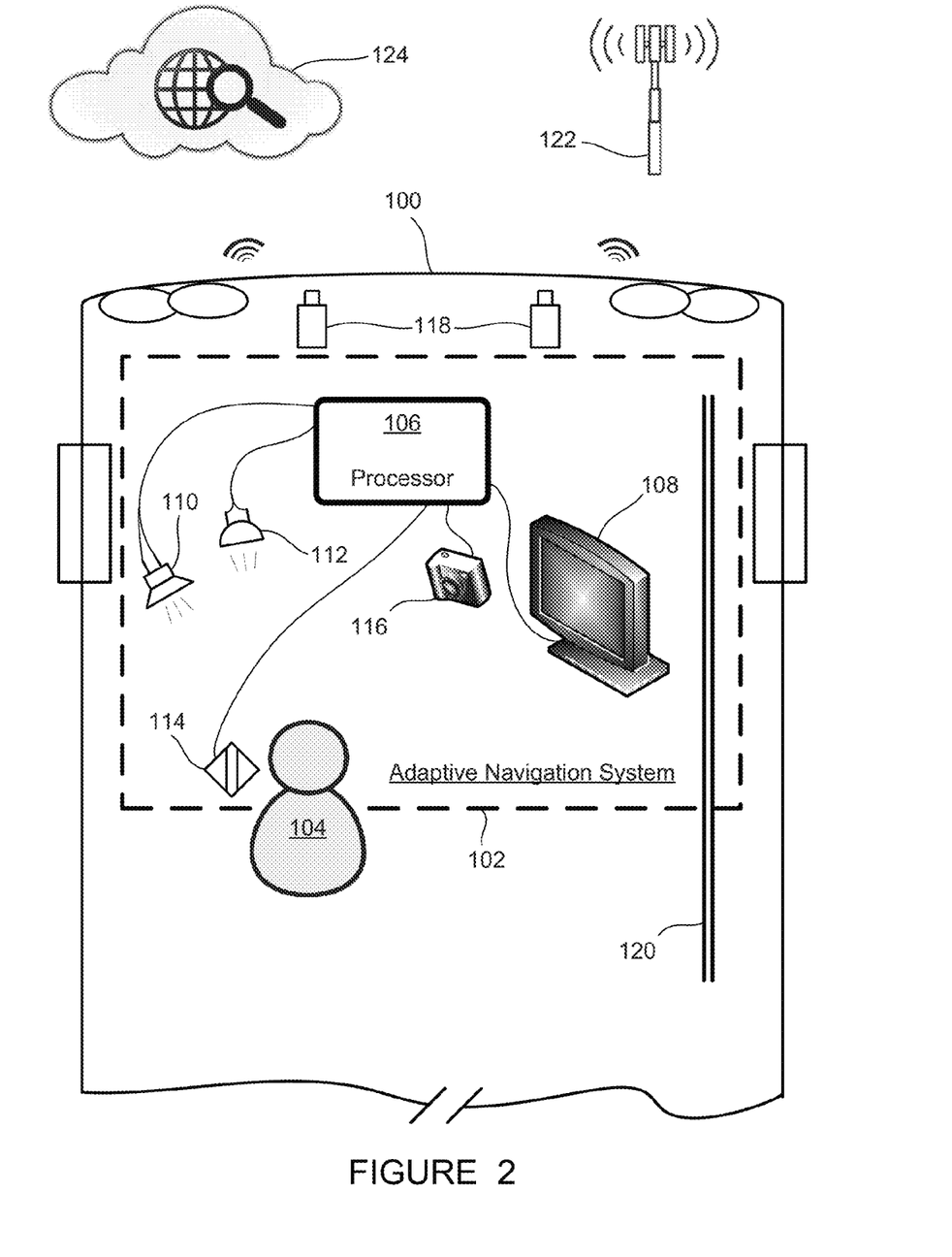
FIG. 2 is a schematic diagram of a vehicle including a navigation system which is configured to provide adaptive guidance based on user behavior.

FIG. 2 is a schematic diagram of a vehicle 100 including an adaptive navigation system 102 which is configured to provide adaptive guidance to a driver 104 based on driver behavior. The adaptive navigation system 102 includes a processor 106 and a display 108. The navigation system 102 also includes at least one speaker 110 for providing audio output in the vehicle 100, and at least one microphone 112 for receiving audio input from the driver 104. Using the processor 106, the display 108, the speaker 110 and the microphone 112, the navigation system 102 can provide basic navigation guidance to a destination as would be provided by any typical navigation system.

The processor 106 is illustrated in FIG. 2 and described herein as a discrete element, however, such illustration is for ease of description and it should be recognized that the functions performed by this element may be combined in one or more devices, e.g., implemented in software, hardware, and/or application-specific integrated circuitry. The processor 106 may be a special-purpose or general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The processor 106 has a set of processing algorithms, described in the methods discussed below, comprising resident program instructions and calibrations stored in the non-volatile memory and executed to provide the respective functions. The algorithms may be executed during preset time-based loop cycles, or the algorithms may be executed in response to occurrence of an event.

The display 108 may be shared with a vehicle infotainment system, climate control interface, or for other purposes in the vehicle 100. The display 108 is commonly a touch screen design, where options can be displayed on screen and selections made by the driver 104 touching the screen of the display 108.

In addition to the microphone 112, the adaptive navigation system 102 includes other devices for monitoring user behavior. One or more sensor 114 is placed in close proximity to the driver 104, and may monitor any number of biometric response parameters, such as skin perspiration, blood pressure, heart rate, and brain wave patterns. The sensor 114 could be placed in a driver's seat, in an arm rest, on the steering wheel, and/or any other suitable location. A driver-facing camera 116 continuously records images of the driver's face, which may be used to determine the direction of the driver's visual focus (what the driver is looking at), and may also be used for assessing the driver's facial expression.

One or more outward-facing cameras 118 continuously record images of scenes outside the vehicle, which can be used to locate and read road signs, locate and identify exit and turn lanes, assess traffic and weather conditions around the vehicle 100, and for any other suitable purpose. A vehicle data bus 120 carries data to and from many sub-systems in the vehicle 100. The data bus 120 may be a CAN (Controller Area Network) bus, another communications bus, or a combination thereof. As will be discussed below, the data bus 120 provides data from systems such as powertrain, steering and braking to the navigation system 102 for adaptive guidance purposes.

The vehicle 100, and the navigation system 102 specifically, can communicate wirelessly with a cellular service 122 and the Internet 124. Vehicle Internet access may be achieved via the cellular service 122, or it may bypass the cellular service 122 and reach the Internet 124 via some other form of wireless communication, such as vehicle-to-infrastructure communications using Dedicated Short Range Communications (DSRC) or external Wi-Fi, for example. The cellular service 122 may also be used to reach a telematics service, which provides amenities such as live navigation and concierge services, and also may be used to aggregate the correlations between navigation situations and driver behavior discussed below.

As indicated by the variety of sensors provided in the adaptive navigation system 102 discussed above, driver behavior can be monitored based on many different types of input data. Examples relating to a driver's external visual focus or "gaze" will be discussed first. Other types of driver monitoring data, and examples relating thereto, will be discussed later in this disclosure. These other types of driver monitoring data include driver speech utterances, driver emotions and facial expressions, driving patterns detected from parameters on the data bus 120, and other behavior patterns such as those involving button presses, screen selections, preferences, etc.

Figure 3:
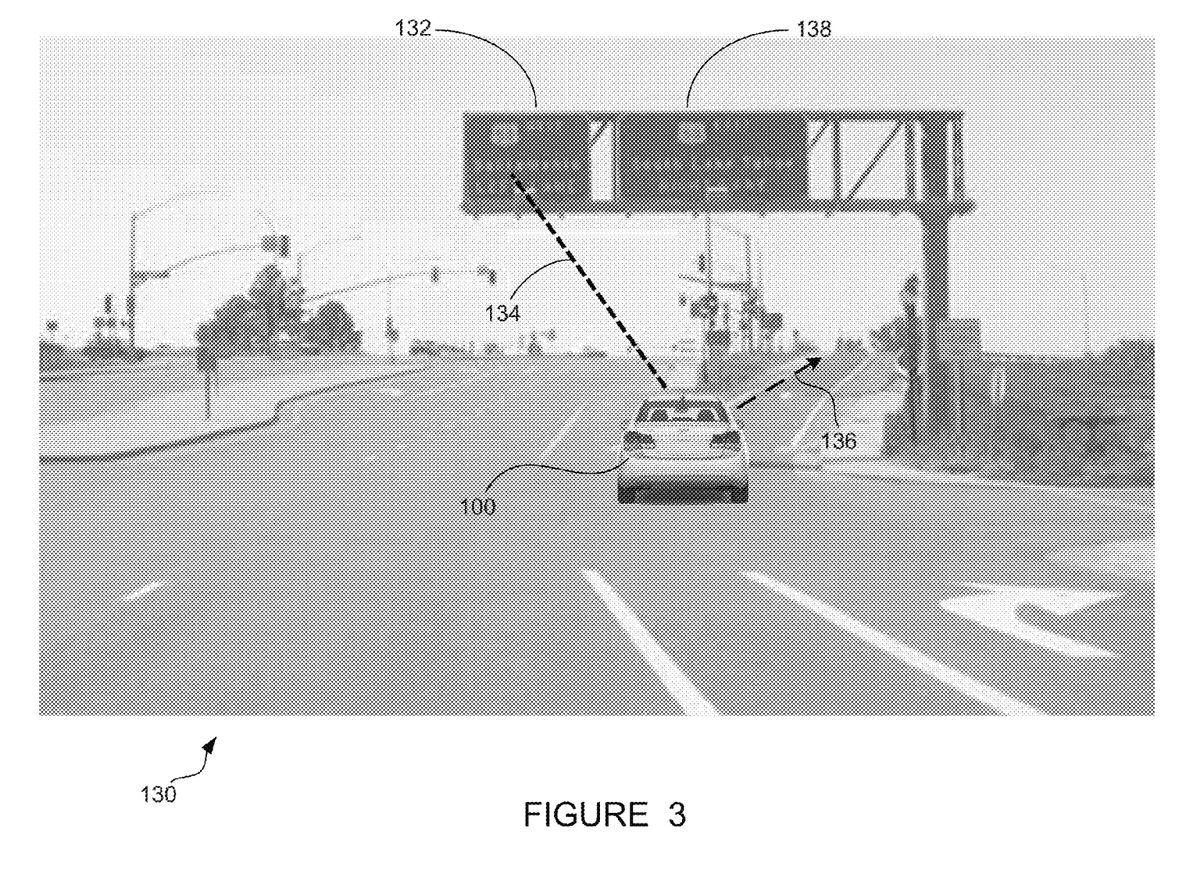
FIG. 3 is an illustration of a roadway scenario where a driver's visual focus is on a road sign which does not correspond to an intended navigation route.

FIG. 3 is an illustration of a roadway scenario 130 where a driver's visual focus is on a road sign which does not correspond to an intended navigation route. In the scenario 130, the driver 104 has entered a destination into the navigation system 102. The vehicle 100 is approaching a combination intersection and interchange, where multiple crossroads and highway entrance ramps are present. In the scenario 130, it is determined by analysis of images from the driver-facing camera 116 that the driver's vision is focused on a road sign 132, as indicated by dashed line 134. Similarly, images from the outward-facing cameras 118 can be used to determine what exists at the location where the driver's vision is directed, and in this scenario, identify and read the road sign 132.

Meanwhile, the navigation system 102 recognizes that the vehicle 100 is steering onto the entrance ramp to the right, as indicated by vector 136. Technology for determining a vehicle's actual and predicted path is known in the art, including using Global Positioning System (GPS) signals, lane tracking systems, vehicle dynamics sensors and other techniques. The route depicted by the vector 136 corresponds to a road sign 138, which advises of a different route than the road sign 132 at which the driver 104 is looking. Regardless of the driver's intended destination, the mismatch between the driver's visual focus, or "gaze", and the driving direction of the vehicle 100 may be used by the adaptive navigation system 102 as a trigger to provide an ad hoc guidance command. For example, the navigation system 102 could tell the driver 104, "We're not going to Sacramento; bear right for South Lake Tahoe".

In the example described above, it is not necessary that the driver 104 stare at the road sign 132 continuously for several seconds. If the driver's focus is placed on the sign 132 for a certain minimum amount of time—either in a single gaze or cumulatively over multiple glances—then the navigation system 102 can conclude that the driver 104 is conscious of the content of the sign 132.

Figure 4:
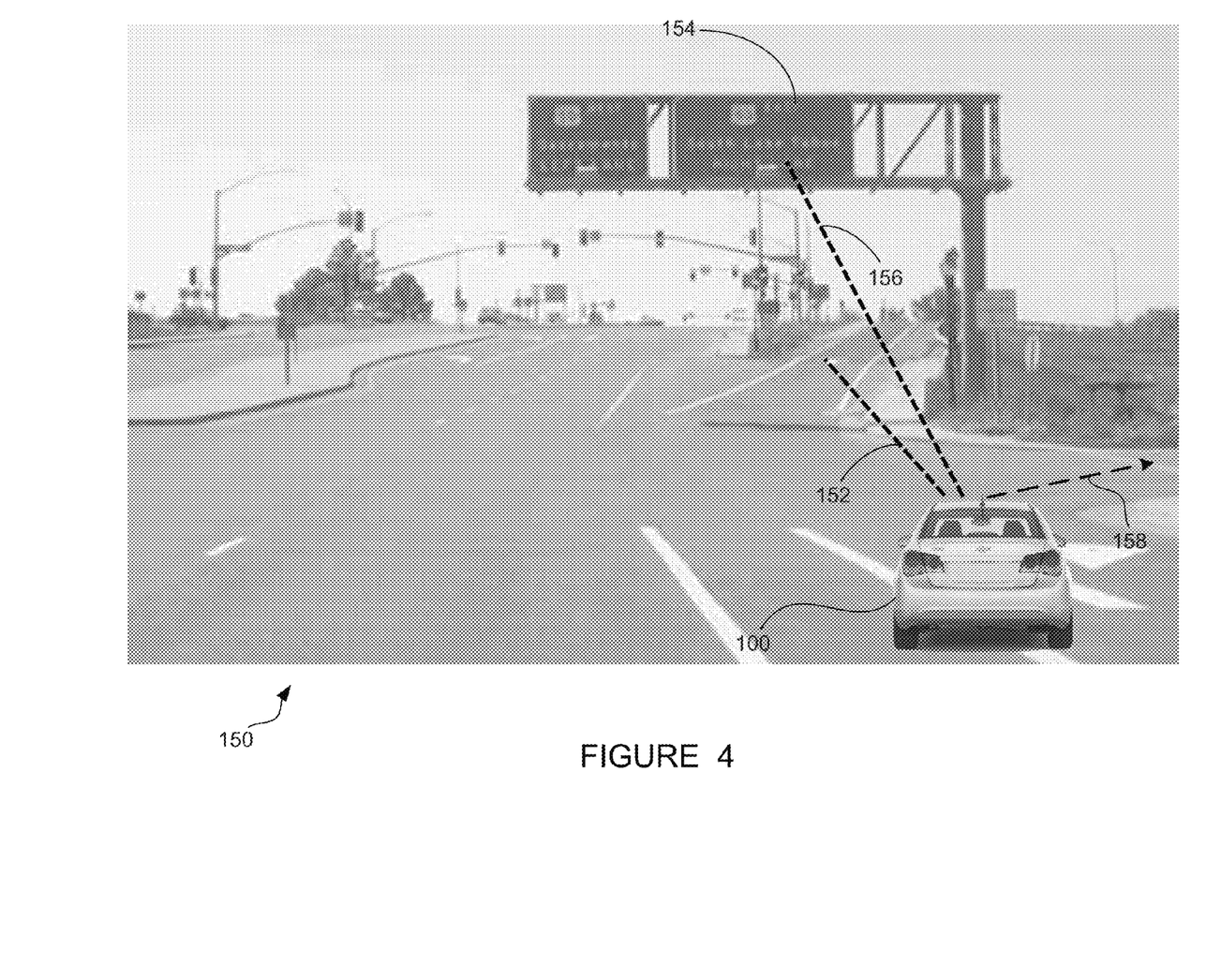
FIG. 4 is an illustration of a roadway scenario where a driver's visual focus is on a road sign which does correspond to an intended navigation route, but the vehicle is beginning a turn to a wrong route.

FIG. 4 is an illustration of a roadway scenario 150 where a driver's visual focus is on a road sign which corresponds to an intended navigation route, but the vehicle is beginning a turn to a wrong route. In the scenario 150, the driver 104 has again entered a destination into the navigation system 102, and the vehicle 100 is again approaching a combination intersection and interchange where multiple crossroads and highway entrance ramps are present. In the scenario 150, it is determined by analysis of images from the driver-facing camera 116 that the driver's vision is alternately focused on two targets; an upcoming entrance ramp, as indicated by dashed line 152, and a road sign 154, as indicated by dashed line 156.

Meanwhile, the navigation system 102 recognizes that the vehicle 100 is turning right onto a crossroad, as indicated by vector 158. The route depicted by the vector 158 does not correspond to the road sign 154. Regardless of the driver's intended destination, the mismatch between the driver's two points of visual focus and the driving direction of the vehicle 100 may be used by the adaptive navigation system 102 as a trigger to provide an ad hoc guidance command. For example, the navigation system 102 could tell the driver 104, "Don't turn right here; continue straight ahead and then bear right for South Lake Tahoe".

An additional example for a case where an adaptive navigation system disambiguates an ambiguous road situation is one which doesn't use external cameras. In this case a map of the terrain exists and driving behavior can be recorded for large numbers of drivers (e.g., using solutions such as Waze, Google, and other collaborative navigation solutions). In this case particular areas—junctions, crossroads, intersections—on the terrain can be identified as "ambiguous" as told by data generated by many users. In this case an "ambiguous" or problematic terrain can be selected and hesitant or error prone behavior can be identified. Once this behavior is identified in relation to the ambiguous terrain, the system can preempt problems by adaptive navigational solutions.

In addition to the examples above where the driver's external gaze is factored into navigation guidance, there are situations where the driver's gaze internal to the vehicle 100 may also be relevant to guidance adaptation. For example, if the driver repeatedly glances at, or stares at, the navigation system display 108, this may be taken as an indication that the driver is not confident that he or she is on the correct route. In this situation, it may be desirable to provide ad hoc guidance communications indicating that the vehicle 100 is still on the correct route, and where and when the next turn or exit will be. Other driver gaze patterns internal to the vehicle 100, for example almost no gaze onto the navigation display and with advance maneuver before navigation guidance, may also be used to trigger guidance modification—either an increase or a decrease in guidance, or a change in guidance content.

Driver speech and other utterances can also be used as input for adaptive guidance. This includes the driver 104 speaking directly to the navigation system 102, as well as incidental comments made by the driver 104. The driver 104 may ask a question of the navigation system 102, or make a statement to the navigation system 102, indicating a desire for more frequent navigation guidance. Examples of driver comments which would result in increased navigation guidance frequency include "where do I turn?", "what do I do next?", "I'm lost", "when will I get there?" and "is it this turn, or the next one?".

The driver 104 may also ask a question of, or make a statement to the navigation system 102, indicating a desire for less frequent navigation guidance. Examples of driver comments which would result in decreased navigation guidance frequency include "not now", "I got it" and "tell me later". Similarly, the driver 104 may ask a question of, or make a statement to the navigation system 102, indicating that modified navigation guidance timing or content is appropriate. Examples of driver comments which would result in modified (not necessarily increased or decreased) navigation guidance frequency, or modified guidance content, include "what do you mean?", "tell me earlier next time" and "can you use a different term?".

The driver 104 may make statements not directed to the navigation system 102 which could also be interpreted by the navigation system 102 as indicative of a desire for modified guidance. These statements could be directed to a passenger in the vehicle 100 or simply "thinking aloud" by the driver 104 (comments directed to nobody in particular). Comments such as "I don't know if this thing is working" and "did you hear what it said?" could be interpreted as a desire for more frequent navigation guidance, while comments such as cursing and "this thing is annoying" could be interpreted as a desire for less frequent navigation guidance.

Many driver emotional cues may also be used as input for adaptive guidance. These emotional cues—irrespective of spoken comments from the driver 104—may be detected by the sensor 114 or the driver-facing camera 116. As mentioned previously, the sensor 114 may be any type of sensor which can detect a biometric response in the driver 104. For example, the sensor 114 may detect driver blood pressure or heart rate, or the sensor 114 may detect perspiration on the vehicle seat, steering wheel or arm rest. The sensor 114 may even detect driver "brain waves" through electro-encephalography techniques which have been developed. These biometric response parameters can, in many cases, be interpreted in relation to adaptive navigation guidance. For example, an elevated blood pressure or heart rate, or an increase in perspiration, could be interpreted as driver anxiety and taken as an indication that navigation guidance frequency should be increased. Conversely, indications of a relaxed driver state, such as normal blood pressure and heart rate, or calm electro-encephalographic readings, may be taken to suggest that navigation guidance frequency can be maintained or reduced.

Facial expressions detected by the driver-facing camera 116 may be interpreted for adaptive guidance by the navigation system 102. For example, if the driver 104 has a facial expression that is calm and relaxed, this could be taken as an indication that navigation guidance frequency can be reduced, or at least that the driver 104 is comfortable with the current navigation guidance. If, however, the driver 104 has a facial expression that is worried or anxious, this could be taken as an indication that navigation guidance frequency should be increased. Facial expression recognition technology to enable this sort of navigation guidance adaptation is known in the art.

Driving behavior, as reflected in the operation of the vehicle 100, can also be used as input for adaptive navigation guidance. Many different parameters related to the vehicle 100 and its subsystems are available on the data bus 120. Useful data related to the engine/powertrain, steering, brakes, and other drive-related systems may be obtained from the bus 120. In addition, data related to comfort and convenience systems such as HVAC and infotainment may be used, as well as configurations such as seat and window positions, lighting and others. Examples of situations where data from the data bus 120 suggest increased navigation guidance include approaching a turn too fast (indicating lack of awareness of upcoming turn) or frequent brake taps (indicating uncertainty on the part of the driver 104). Conversely, low vehicle speed in heavy traffic conditions may be taken as an indication that navigation guidance frequency can be decreased. Content may also be modified in some situations based on data from the bus 120—such as adding an ad hoc suggestion to "slow down" if the vehicle 100 is approaching a turn too fast.

Location-based services (LBS) is a feature which has recently increased in popularity in navigation systems. With LBS, a person's current location is used—along with other factors, such as time of day, personal preferences, etc.—to provide customized information, promotional offers and recommendations for products and services to the person. For example, a driver who is known to frequently stop at a certain coffee shop could be offered a discount if he or she is near the coffee shop at a time when business is slow. Likewise, a driver could be notified of a sale on a particular brand of clothing at a store, or a "no waiting" status at a hair salon, when he or she is nearby the store or the salon. LBS also includes simple notifications and recommendations, such as a vehicle which is low on fuel receiving directions to a nearby preferred brand of gas station. Because location is obviously known by navigation systems, LBS features have naturally been added to many navigation systems.

The adaptive guidance features discussed in detail above can also be included in LBS-initiated navigation guidance. For example, monitoring by the driver-facing camera 116 of the driver's visual focus could determine that the driver 104 has examined a billboard, and the outward-facing cameras 118 could determine that the billboard is an advertisement for a particular fast food chain. The LBS features of the navigation system 102 could then offer directions to the nearest franchise location of the fast food chain, and also offer any available discounts.

In another LBS scenario, driver gaze tracking may indicate that the driver 104 has not spotted an upcoming turn, such as a parking lot entrance which is obstructed. In such a situation, a "slow down" notice can be issued if the driver is driving too fast, additional notifications or descriptions of the turn can be provided, etc. In any LBS scenario, different adaptations of the guidance—the frequency and content of the driving instructions—are possible, based on driver behavior.

Figure 5:
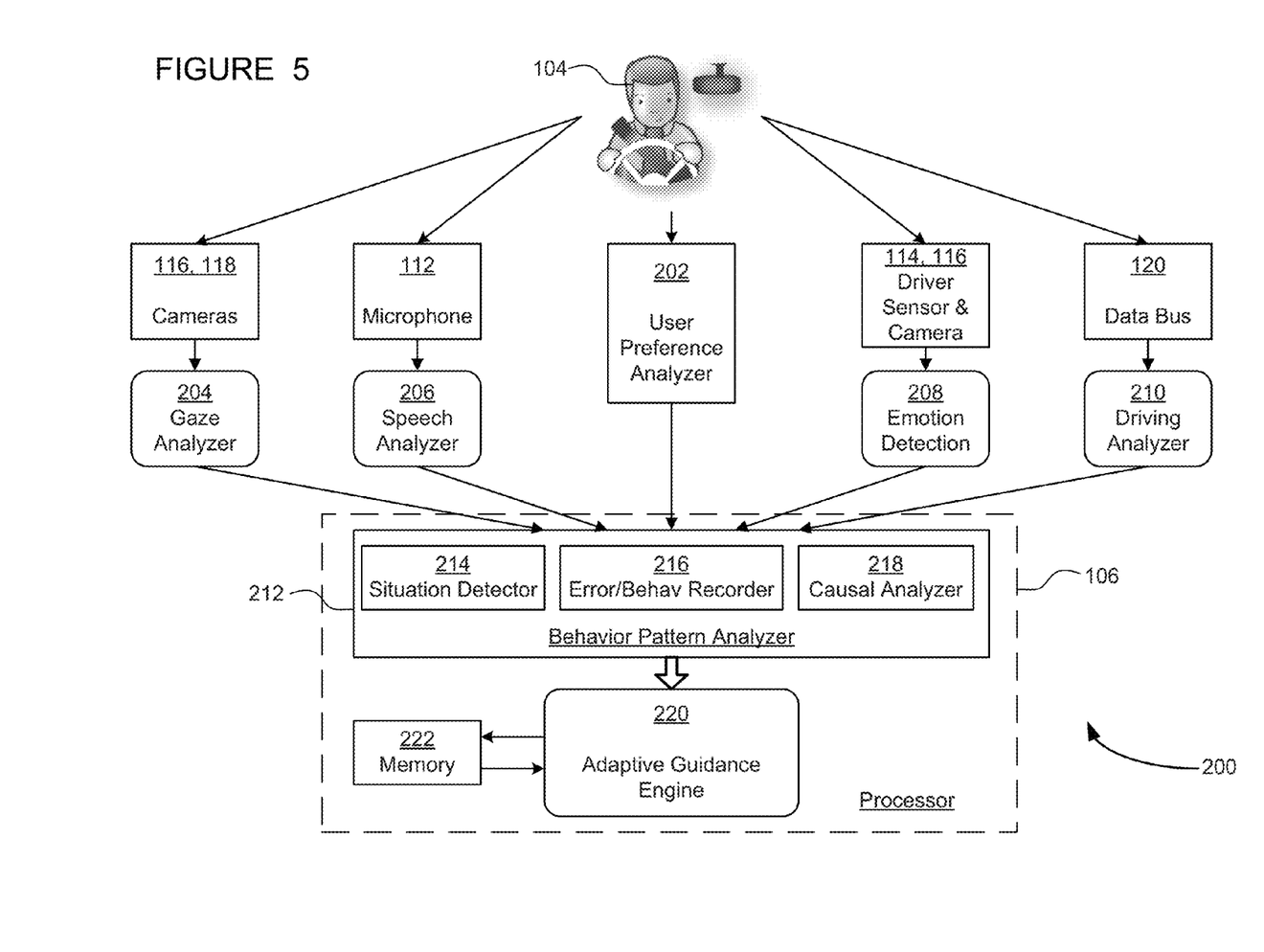
FIG. 5 is a block diagram of a system for providing adaptive navigation and location-based services based on user behavior patterns.

FIG. 5 is a block diagram of a system 200 for providing adaptive navigation and location-based services based on user behavior patterns. The system 200 is an embodiment of the navigation system 102 discussed above. The system 200 includes both hardware components and software algorithms, as described below. The core adaptive navigation features of the system 200 are shown as being embodied in the processor 106 of FIG. 2. The software algorithms of the system 200 could all be executed on the processor 106, or they could be distributed across two or more processors. All elements of the system 200 are onboard a vehicle, such as the vehicle 100.

The behavior patterns of the driver 104 are the basis for the navigation adaptations in the system 200. A user preferences analyzer 202 uses the identity of the driver 104 to establish a base set of user preferences, which have been previously entered. The driver-facing camera 116 records images of the driver 104, and a gaze-tracking system analyzer 204 detects driver gaze patterns inside or outside the vehicle 100. As discussed previously, the gaze-tracking system analyzer 204 can determine where the driver's visual focus is placed based on images from the driver-facing camera 116. The analyzer 204 can resolve the target of the driver's gaze internal to the vehicle 100 using known vehicle geometry data—determining that the driver 104 is looking at the navigation display 108, for example. The analyzer 204 can also determine the location of the driver's gaze external to the vehicle 100, and this information can be coupled with images from the outward-facing cameras 118 to resolve the target of the driver's gaze when looking outside.

The microphone 112 picks up driver speech or other utterances, and a speech system analyzer 206 analyzes the driver's vocalizations to determine if they are relevant to navigation. As discussed previously, driver vocalizations may be directed to the navigation system 102 itself, or they may be directed to a passenger or to nobody in particular but still be relevant to navigation guidance.

The driver-facing camera 116 and the sensor 114 gather data for an emotion detection system 208. The emotion detection system 208 determines the driver's emotional state—such as relaxed, anxious, angry, etc.—based on the driver's facial expressions and other biometric response data. The data bus 120 provides data to a driving pattern analyzer 210, which determines driving patterns from the bus data. The driving patterns may be objective—such as driving too fast for an approaching turn—or they may be subjective—such as determining that the driver 104 is driving smoothly or erratically. As mentioned above, the user preferences analyzer 202, the gaze-tracking system analyzer 204, the speech system analyzer 206, the emotion detection system 208 and the driving pattern analyzer 210 may be programmed into one or more separate processors, or they may be incorporated into the processor 106.

Outputs from the user preferences analyzer 202, the gaze-tracking system analyzer 204, the speech system analyzer 206, the emotion detection system 208 and the driving pattern analyzer 210 are provided to a behavior pattern analyzer 212, which includes a situation detector 214, an error and behavior recorder 216 and a causal analyzer 218. The situation detector 214 converts the input information into a situation. In its simplest form, the situation detector 214 determines whether the driver 104 is satisfied or dissatisfied with the navigation guidance that he or she is receiving. This determination is made from the available input data regarding the driver's visual focus, speech and emotions.

The error and behavior recorder 216 records errors (such as missed turns or wrong turns) as well as other behaviors of the driver 104. The other behaviors could include properly following navigation directions, or cancelling navigation guidance, among other things. In short, the error and behavior recorder 216 records what the driver does, as it related to navigation guidance.

The causal analyzer 218 evaluates correlations between the situations from the situation detector 214 and the behaviors from the error and behavior recorder 216. The causal analyzer 218 may determine, for example, that the driver 104 frequently misses a turn or makes a wrong turn when his or her eyes are directed excessively on the navigation display 108, or that the driver 104 does a better job of following directions when fewer instructions are given. Many different types of correlations between driver behavior patterns and driving performance may be identified.

Data from the behavior pattern analyzer 212 are used by an adaptive guidance engine 220 to adaptively modify navigation guidance provided to the driver 104. As discussed in detail previously, navigation guidance may be increased in case of a lost or anxious driver, decreased in case of a driver who becomes frustrated upon issuance of a guidance command, or otherwise modified in frequency or content. These are just a few examples of the type of navigation guidance adaptations that may be made. Such adaptations may also be applied to location-based services, along with traditional navigation to a destination. A memory module 222 can be used to store patterns—between situations, behaviors and guidance adaptations—for future reference.

Figure 6:
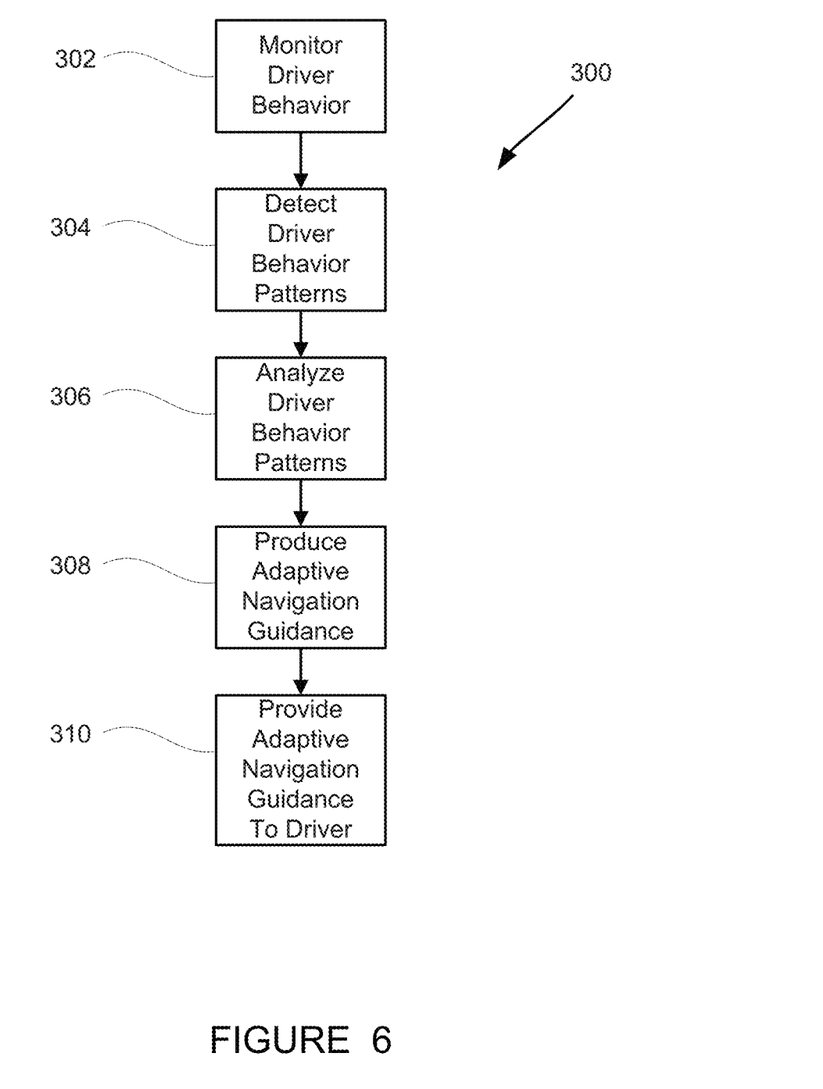
FIG. 6 is a flowchart diagram of a method for providing adaptive navigation and location-based services based on user behavior patterns.

FIG. 6 is a flowchart diagram 300 of a method for providing adaptive navigation and location-based services based on user behavior patterns. At box 302, driver behavior is monitored using the microphone 112, the one or more sensor 114, the driver-facing camera 116, the outward-facing cameras 118 and the data bus 120. At box 304, driver behaviors are detected using the gaze-tracking system analyzer 204, the speech system analyzer 206, the emotion detection system 208 and the driving pattern analyzer 210. The behaviors detected at the box 304 include eye gaze, speech, emotion and facial expressions, and driving patterns.

At box 306, driver behavior patterns are analyzed, using data from the gaze-tracking system analyzer 204, the speech system analyzer 206, the emotion detection system 208 and the driving pattern analyzer 210 as input, along with the user preferences analyzer 202. As discussed previously, the driving behavior pattern analyzer 212 employed at the box 306 includes the situation detector 214, the error and behavior recorder 216 and the causal analyzer 218. At box 308, the driving situations, behavior patterns and correlations from the box 306 are used to produce adaptive navigation guidance and adaptive location-based services instructions. At box 310, the adaptive guidance and LBS instructions are provided to the driver 104.

Using the methods disclosed herein, navigation guidance and location-based services provided to drivers can be adaptively modified based on driver behavior patterns which are recorded and analyzed. The adaptive guidance can reduce navigation errors while simultaneously adapting to a driver's preferences for navigation guidance frequency and content, thereby increasing navigation system user satisfaction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for providing adaptive guidance for driver navigation of a vehicle, said system comprising:
   a plurality of sensor systems for monitoring and analyzing behavior of a driver;
   a display device for displaying navigation maps and providing visual navigation instructions to the driver;
   a speaker for providing audio navigation instructions to the driver; and
   an adaptive navigation guidance processor which receives output signals from the sensor systems and is configured with algorithms including:
   a situation detector module configured to determine a level of driver satisfaction with navigation guidance content and timing;
   an error and behavior recorder module configured to identify driver errors and behaviors;
   a causal analyzer module configured to determine correlations between the driver errors and behaviors and the level of driver satisfaction with navigation guidance content and timing; and
   an adaptive navigation guidance module configured to adaptively modify the navigation guidance content and timing based on outputs from the situation detector module, the error and behavior recorder module and the causal analyzer module, and provide the navigation guidance to the driver via an audio speaker or display navigation map and provide visual navigation instructions the display device, including providing ad hoc guidance instructions to the driver when behavior patterns indicate that the driver is uncertain about a current driving route.

2. The system of claim 1 wherein the plurality of sensor systems includes a gaze tracking system, a speech detection system and an emotion detection system.

3. The system of claim 2 wherein the gaze tracking system includes a driver-facing camera, and an gaze tracking system analyzer which analyzes images from the driver-facing camera to determine a location of a gaze of the driver, and where the adaptive navigation guidance module modifies the navigation guidance content or timing based on where the gaze of the driver is directed.

4. The system of claim 3 further comprising one or more outward-facing cameras for recording images outside the vehicle, where the images from the outward-facing cameras are used in conjunction with the location of the gaze of the driver to determine if the driver has observed a road sign, and driver observation of the road sign is used as a factor in the adaptive navigation guidance module.

5. The system of claim 2 wherein the speech detection system includes a microphone, and a speech analyzer which analyzes audio signals from the microphone and identifies utterances from the driver.

6. The system of claim 5 wherein the utterances from the driver are used to determine if the driver is satisfied with the navigation guidance, and the navigation guidance content or timing is modified if the driver is not satisfied.

7. The system of claim 2 wherein the emotion detection system includes one or more sensors proximal to the driver, and an emotion analyzer which analyzes signals from the one or more sensors and identifies emotions of the driver.

8. The system of claim 7 wherein the one or more sensors includes a perspiration sensor and a heart rate sensor.

9. The system of claim 7 wherein the emotion detection system also analyzes images from a driver-facing camera and identifies emotions of the driver based on driver facial expressions from the images.

10. The system of claim 7 wherein the emotions of the driver are used to determine if the driver is calm, and the navigation guidance content or timing is modified if the driver is not calm.

11. The system of claim 1 wherein the adaptive navigation guidance processor also receives input from a vehicle data bus, including vehicle speed, steering and braking data, and the input from the vehicle data bus is used by the adaptive navigation guidance module to identify driving patterns which indicate navigation guidance should be modified.

12. The system of claim 1 wherein the adaptive navigation guidance processor is also configured to provide adaptively modified location-based services to the driver, where the location-based services include information and promotional offers for businesses near a destination or route of the driver.

13. A system for providing adaptive guidance for driver navigation of a vehicle, said system comprising:
a gaze tracking system including a driver-facing camera and a gaze tracking system analyzer which analyzes images from the driver-facing camera to determine a location of a gaze of the driver;
a speech detection system including a microphone and a speech analyzer which analyzes audio signals from the microphone and identifies utterances from the driver;
an emotion detection system including one or more sensors proximal to the driver and an emotion analyzer which analyzes signals from the one or more sensors and identifies emotions of the driver;
a display device for displaying navigation maps and providing visual navigation instructions to the driver;
a speaker for providing audio navigation instructions to the driver; and
an adaptive navigation guidance processor which receives output signals from the gaze tracking system, the speech detection system, the emotion detection system and a vehicle data bus, where the adaptive navigation guidance processor is configured with algorithms including:
a behavior pattern analyzer module configured to determine a level of driver satisfaction with navigation guidance content and timing, identify driver errors and behaviors, and determine correlations between the driver errors and behaviors and the level of driver satisfaction with navigation guidance content and timing; and
an adaptive navigation guidance module configured to adaptively modify the navigation guidance content and timing based on outputs from the behavior pattern analyzer module, and provide the navigation instructions to the driver.

14. The system of claim 13 wherein the level of driver satisfaction is determined from the driver utterances identified by the speech detection system and the driver emotions identified by the emotion detection system, and the driver errors and behaviors are determined from the location of the visual focus of the driver and the signals from the vehicle data bus.

15. A method for providing adaptive guidance for driver navigation of a vehicle, said method comprising:
monitoring and identifying behaviors of a driver using a plurality of sensor systems;
analyzing, using a microprocessor, behavior patterns of the driver using outputs from the plurality of sensor systems;
adaptively modifying by the microprocessor content and timing of navigation guidance instructions based on the behavior patterns of the driver; and
providing the navigation guidance instructions to the driver via an audio speaker or a display unit displaying navigation map and providing visual navigation instructions on a display device, including providing ad hoc guidance instructions to the driver when the behavior patterns indicate that the driver is uncertain about a current driving route.

16. The method of claim 15 wherein the plurality of sensor systems includes a gaze tracking system including a driver-facing camera and a gaze tracking system analyzer which analyzes images from the driver-facing camera to determine a location of a gaze of the driver, and where the location of the gaze of the driver is used as a factor in modifying the content or timing of the navigation guidance instructions.

17. The method of claim 16 further comprising using images from one or more outward-facing cameras in conjunction with the location of the gaze of the driver to determine if the driver has observed a road sign, and driver observation of the road sign is used as a factor in modifying the content or timing of the navigation guidance instructions.

18. The method of claim 15 wherein the plurality of sensor systems includes a speech detection system including a microphone and a speech analyzer which analyzes audio signals from the microphone and identifies utterances from the driver, and where the utterances from the driver are used to determine if the driver is satisfied with the navigation guidance, and the content or timing of the navigation guidance instructions is modified if the driver is not satisfied.

19. The method of claim 15 wherein the plurality of sensor systems includes an emotion detection system including one or more sensors proximal to the driver and an emotion analyzer which analyzes signals from the one or more sensors and identifies emotions of the driver, the emotion detection system also analyzes images from a driver-facing camera and identifies emotions of the driver based on driver facial expressions from the images, the emotions of the driver are used to determine if the driver is calm, and the content or timing of the navigation guidance instructions is modified if the driver is not calm.

20. The method of claim 15 further comprising providing input from a vehicle data bus, including vehicle speed, steering and braking data, and the input from the vehicle data bus is used in analyzing the behavior patterns of the driver.

* * * * *